(12) United States Patent
Liang et al.

(10) Patent No.: US 10,834,521 B1
(45) Date of Patent: Nov. 10, 2020

(54) SYSTEM AND METHOD OF USING SPATIAL AND TEMPORAL SIGNALS TO IDENTIFY AND PREVENT ATTACKS

(71) Applicant: Google LLC, Mountain View, CA (US)

(72) Inventors: Sam Liang, Palo Alto, CA (US);
Michael Chu, Los Altos Hills, CA (US); Yuhua Luo, San Jose, CA (US);
Zhengrong Ji, Sunnyvale, CA (US);
Yan Yu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/420,940

(22) Filed: May 23, 2019

Related U.S. Application Data

(62) Division of application No. 15/901,225, filed on Feb. 21, 2018, now Pat. No. 10,349,202, which is a division of application No. 13/916,838, filed on Jun. 13, 2013, now Pat. No. 9,936,339, which is a division of application No. 12/775,848, filed on May 7, 2010, now Pat. No. 8,489,732.

(60) Provisional application No. 61/313,339, filed on Mar. 12, 2010, provisional application No. 61/232,061, filed on Aug. 7, 2009.

(51) Int. Cl.
*G06F 15/16* (2006.01)
*H04W 4/02* (2018.01)

(52) U.S. Cl.
CPC .................................... *H04W 4/02* (2013.01)

(58) Field of Classification Search
None
See application file for complete search history.

(56) References Cited

U.S. PATENT DOCUMENTS

| | | | |
|---|---|---|---|
| 5,794,210 A | 8/1998 | Goldhaber et al. | |
| 6,295,446 B1 | 9/2001 | Rocha | |
| 6,804,701 B2 | 10/2004 | Muret et al. | |
| 6,816,722 B2 | 11/2004 | Blom et al. | |
| 7,539,134 B1 * | 5/2009 | Bowes | H04L 1/0072 370/230 |
| 7,561,101 B1 * | 7/2009 | Tester | G01S 5/0027 342/357.77 |
| 7,680,891 B1 | 3/2010 | Pongsajapan | |

(Continued)

FOREIGN PATENT DOCUMENTS

WO 03094562 A1 11/2003

*Primary Examiner* — Phuoc H Nguyen
(74) *Attorney, Agent, or Firm* — Lerner, David, Littenberg, Krumholz & Mentlik, LLP

(57) ABSTRACT

Systems and methods according to aspects of the invention verify requests for information over a network. Computing devices communicating over a network transmit numerous signals with various types of information including spatial information, temporal information, device-specific information, and transmission specific information. This information may be used to generate statistical records of valid request for information. Various combinations of these signals may be used to determine whether a request for information is a valid request based on the statistical records associated with the signals. Where a request for information has been verified, the system and method may provide the information. Where the request for information has not been verified, the system and method may deny the request for information. Thus the system and method may be used to prevent and block scraping and spamming attacks.

17 Claims, 9 Drawing Sheets

(56) References Cited

U.S. PATENT DOCUMENTS

| | | | |
|---|---|---|---|
| 7,925,740 B2 | 4/2011 | Nath et al. | |
| 7,996,912 B2 | 8/2011 | Spalink et al. | |
| 8,041,303 B2 | 10/2011 | Jiang et al. | |
| 8,220,034 B2 | 7/2012 | Hahn et al. | |
| 8,347,378 B2 | 1/2013 | Merkin et al. | |
| 8,555,367 B2 | 10/2013 | Syed et al. | |
| 8,661,121 B1* | 2/2014 | Mendis | H04W 4/029 709/224 |
| 9,418,040 B2 | 8/2016 | Cordray et al. | |
| 2001/0036224 A1 | 11/2001 | Demello et al. | |
| 2002/0077897 A1 | 6/2002 | Zellner et al. | |
| 2002/0102993 A1 | 8/2002 | Hendrey et al. | |
| 2004/0064452 A1 | 4/2004 | Matsui et al. | |
| 2004/0132464 A1 | 7/2004 | Poykko et al. | |
| 2004/0246856 A1 | 12/2004 | Fukushima | |
| 2005/0202780 A1 | 9/2005 | Kall et al. | |
| 2006/0059092 A1 | 3/2006 | Burshan et al. | |
| 2007/0106784 A1* | 5/2007 | Dickman | H04L 41/0677 709/224 |
| 2007/0268908 A1 | 11/2007 | Linkola et al. | |
| 2008/0022003 A1* | 1/2008 | Alve | G01S 5/0009 709/229 |
| 2008/0182592 A1 | 7/2008 | Cha et al. | |
| 2008/0250147 A1* | 10/2008 | Knibbeler | H04W 4/029 709/229 |
| 2009/0031006 A1* | 1/2009 | Johnson | G06F 16/972 709/218 |
| 2009/0144408 A1 | 6/2009 | Wilf et al. | |
| 2009/0248623 A1 | 10/2009 | Adelman et al. | |
| 2010/0042833 A1 | 2/2010 | Platt | |
| 2010/0088187 A1 | 4/2010 | Courtney et al. | |
| 2010/0211997 A1 | 8/2010 | McGeehan et al. | |
| 2010/0250727 A1 | 9/2010 | King et al. | |
| 2010/0278141 A1* | 11/2010 | Choi-Grogan | H04W 4/90 370/331 |
| 2011/0209200 A2* | 8/2011 | White | G06F 21/32 726/4 |
| 2011/0223937 A1 | 9/2011 | Leppanen et al. | |
| 2011/0258449 A1 | 10/2011 | Rosner et al. | |
| 2012/0158934 A1* | 6/2012 | Xiao | G06Q 30/02 709/223 |

\* cited by examiner

SYSTEM AND METHOD OF USING SPATIAL AND TEMPORAL SIGNALS TO IDENTIFY AND PREVENT ATTACKS

CROSS-REFERENCE TO RELATED APPLICATIONS

The present application is a divisional of U.S. application Ser. No. 15/901,225, filed on Feb. 21, 2018 which is a divisional of U.S. application Ser. No. 13/916,838, filed on Jun. 13, 2013, now issued as U.S. Pat. No. 9,936,339, which is a divisional of U.S. application Ser. No. 12/775,848, filed on May 7, 2010, now issued as U.S. Pat. No. 8,489,732, which claims the benefit of U.S. Provisional Application No. 61/313,339 filed Mar. 12, 2010, as well as U.S. Provisional Application No. 61/232,061 filed Aug. 7, 2009, the disclosures of which are hereby incorporated herein by reference.

BACKGROUND OF THE INVENTION

Mapping and user location services collect and utilize user location information to provide users with services and information about the user's planned or current location. For example, GPS or cellular tower location ("CellID") based mapping systems such as Google Maps for Mobile can send real-time, updated information to a user's mobile device such as a cell phone to display maps of the user's position as he or she travels from one point to the next. User location information, such as GPS, WiFi and/or cell ID data, is provided to such systems so that this information can be used for the benefit of the user, such as providing the user with services such as street maps, route planners for travel by foot or by car, or business locator services.

Gathering, utilizing, and storing user location information, however, can present a number of challenges. For example, these systems may receive hundreds of thousands of requests for location information. Some of these requests may be completely legitimate. However, some third parties, commonly referred to as scrapers, may attempt to gain access to database information by misleading the system by manipulating information about the request and origin of the request. Data scraping typically occurs when computers, rather than people, visit websites and automatically collect data intended for an end-user, rather than as input to another program. Scraping is generally unwanted, as it increases system load and loss of control of the information content.

End-user systems, such as Google, Inc.'s Google Location Platform, which provides a global location platform across different device platforms and carriers in the industry, include large location databases and thus become a target for scraping. In the past, anti-scraping efforts mostly relied on human intervention to spot trends and unauthorized access to the database information by dedicated developers conducting data mining, deriving defense policies, and manually pushing to the location server to block the scrapers.

Other entities attempt to overwhelm these end-user information services by sending a large number of requests within a short period. These attacks are known as spam. Spam attacks can slow processing times of legitimate requests causing annoyance, or, in some cases, shutting down the information altogether. Generally, systems rely on user complaints or third party reports of spam attacks in order to identify them.

BRIEF SUMMARY OF THE INVENTION

Aspects of the invention relate generally to verification of requests for information over a network. More specifically, various signals from network device may be used to determine the validity of a particular request.

One aspect of the invention provides a method of determining the validity of a request for information over a network. The method includes storing a plurality of threshold values each associated with a geographic location; receiving, from a first device of the network, a request for information identifying a target location, the request including information indicating a geographic location of the first device; and selecting a threshold value based on the target location; and determining, by a second device of the network, if the request for information is a valid request, where a valid request identifies a target location which is less than a threshold distance from the geographic location of the first device.

In one example, the target location is identified by a WiFi signal.

In another example, the target location is identified by a broadcast structure location.

In another example, the information indicating a geographic location of the first device is an IP address.

In another example, the information indicating a geographic location of the first device is GPS coordinates.

In another example, the method further includes transmitting the requested information if the request is an invalid request.

Another aspect of the invention provides a device for determining the validity of a request for information over a network. The device includes memory storing a plurality of threshold values each associated with a geographic location; and a processor. The processor is programmed to receive, from a first device of the network, a request for information identifying a target location, the request including information indicating a geographic location of the first device; and select a threshold value based on the target location; and determine, if the request for information is a valid request, where a valid request identifies a target location which is less than a threshold distance from the geographic location of the first device.

In one example, the target location is identified by a WiFi signal.

In another example, the target location is identified by a broadcast structure location.

In another example, the information indicating a geographic location of the first device is an IP address.

In another example, the information indicating a geographic location of the first device is GPS coordinates.

In another example, the processor is further configured to transmit the requested information if the request is an invalid request.

Another aspect of the invention provides a method of determining the validity of a request for information over a network. The method includes storing a plurality of statistical records of requests each associated with at least one geographic location and including information identifying a temporal pattern of requests; receiving, from a plurality of network devices, a request for information, the request including a time attribute and information indicating a geographic location of the requesting device of the plurality of network devices; selecting a statistical record of requests, from the plurality of statistical records of requests each associated with at least one geographic location, a statistical record of requests based on the geographic location of the plurality of network devices, wherein the plurality of statistical records of requests includes information identifying a temporal pattern of requests; determining if the requests for information are valid requests, where a valid request includes a time attribute that is consistent with the identified temporal pattern of request for the selected statistical record of requests.

In one example, the selected statistical record of requests includes queries per second.

In another example, the selected statistical record of requests includes queries per second identifying unique keys, where a unique key indicates that a request for information is newly requested.

On another example, the selected statistical record of requests includes a time distribution of requests from a particular geographic area.

In another example, the selected statistical record of requests includes failure rates for requests for information.

In another example, the at least one time attribute includes a time of day and a day of the week.

Another aspect of the invention provides a method of determining the validity of a request for information over a network. The method includes receiving a first request from a node of the network, the request associated with first location information and a first time attribute; receiving a second request from the node of the network, the request associated with second location information and a second time attribute; determining a first location of the device from the first location information; determining a second location of the device from the second location information; determining a time difference between the first time attribute and the second time attribute; determining a geographic distance between the first location and the second location; selecting, from a plurality of statistical records of requests each associated with a time difference and a threshold distance, a statistical record of requests based on the time difference; and identifying the second request as a valid request if the geographic distance is less than the threshold distance associated with the selected statistical record.

In one example, the method further includes identifying the second request as an invalid request if the geographic distance is greater than the threshold distance associated with the selected statistical record.

In another example, the selected statistical record of requests includes queries per second.

In another example, the selected statistical record of requests includes queries per second identifying unique keys, where a unique key indicates that a request for information is newly requested.

In another example, the selected statistical record of requests includes a time distribution of requests from a particular geographic area.

In another example, the selected statistical record of requests includes failure rates for requests for information.

In another example, the at least one time attribute includes a time of day and a day of the week.

Another aspect of the invention provides a device for determining the validity of a request for information over a network. The device includes memory storing a plurality of statistical records of requests each associated with at least one geographic location and including information identifying a temporal pattern of requests; and a processor. The processor is configured to receive, from a plurality of network devices, a request for information, the request including a time attribute and information indicating a geographic location of the requesting device of the plurality of network devices; select a statistical record of requests from the plurality of statistical records of requests, based on the geographic location of the plurality of network devices; and determine if the requests for information are valid requests, where a valid request includes a time attribute that is consistent with the identified temporal pattern of request for the selected statistical record of requests.

In one example, the selected statistical record of requests includes queries per second.

In another example, the selected statistical record of requests includes queries per second identifying unique keys, where a unique key indicates that a request for information is newly requested.

In another example, the selected statistical record of requests includes a time distribution of requests from a particular geographic area.

In another example, the selected statistical record of requests includes failure rates for requests for information.

In another example, the time attribute includes a time of day and a day of the week.

Another aspect of the invention provides a device for determining the validity of a request for information over a network. The device includes memory storing a plurality of statistical records of requests each associated with a time difference and a threshold distance; and a processor. The processor is programmed to receive a first request from a node of the network, the request associated with first location information and a first time attribute; receive a second request from the node of the network, the request associated with second location information and a second time attribute; determine a first location of the device from the first location information; determine a second location of the device from the second location information; determine a time difference between the first time attribute and the second time attribute; determine a geographic distance between the first location and the second location; select a statistical record of requests from the plurality of statistical records based on the time difference; and identify the second request as a valid request if the geographic distance is less than the threshold distance associated with the selected statistical record.

In one example, the processor is further configured to identify the second request as an invalid request if the geographic distance is greater than the threshold distance associated with the selected statistical record.

In another example, the selected statistical record of requests includes queries per second.

In another example, the selected statistical record of requests includes queries per second identifying unique keys, where a unique key indicates that a request for information is newly requested.

In another example, the selected statistical record of requests includes a time distribution of requests from a particular geographic area.

In another example, the selected statistical record of requests includes failure rates for requests for information.

In another example, the at least one time attribute includes a time of day and a day of the week.

Another aspect of the invention provides a method of determining the validity of a request for information over a network. The method includes generating a list of valid combinations identifying valid combinations of device information and transmission information; receiving, from a first device of the network, a request for information, the request including a device information and transmission information combination; and determining if the request for information is a valid request, where a valid request includes a device information and transmission information combination identified in the list of valid combinations.

In one example, the device information identifies a mobile device.

In another example, the device information identifies hardware associated with the first device.

In another example, the transmission information identifies a carrier.

In another example, the transmission information identifies a network type.

In another example, the device information identifies software associated with the first device.

In another example, the software is an operating system associated with the first device.

In another example, the software is a browser associated with the first device.

Another aspect of the invention provides a device for determining the validity of a request for information over a network. The device includes memory storing a list of valid combinations identifying valid combinations of device information and transmission information; and a processor. The processor is programmed to receive, from a first device of the network, a request for information, the request including a device information and transmission information combination; and determine if the request for information is a valid request, where a valid request includes a device information and transmission information combination identified in the list of valid combinations.

In one example, the device information identifies a mobile device.

In another example, the device information identifies hardware associated with the first device.

In another example, the transmission information identifies a carrier.

In another example, the transmission information identifies a network type.

In another example, the device information identifies software associated with the first device.

In another example, the software is an operating system associated with the first device.

In another example, the software is a browser associated with the first device.

Another aspect of the invention provides a method of determining the validity of a request for information over a network. The method includes generating a list of valid combinations identifying valid combinations of geographic location, device information and transmission information; receiving, from a first device of the network, a request for information, the request including information identifying a location of the first device, device information and transmission information combination; determining, based on the received information a geographic location of the first device; determining if the request for information is a valid request, where a valid request includes a geographic location, device information and transmission information identified in list of valid combinations.

In one example, the device information identifies a mobile device.

In another example, the device information identifies hardware associated with the first device.

In another example, the transmission information identifies a mobile phone carrier.

In another example, the transmission information identifies a network type.

In another example, the network type is a GSM network.

In another example, the device information identifies software associated with the first device.

In another example, the software is an operating system associated with the first device.

In another example, the software is a browser associated with the first device.

In another example, the information indicating the location of the first device is an IP address associated with the first device.

In another example, the information indicating the location of the first device is an IP address associated with a proxy-server.

Another aspect of the invention provides a device for determining the validity of a request for information over a network. The device includes memory a list of valid combinations identifying valid combinations of geographic location, device information and transmission information; and a processor. The processor is programmed to receive, from a first device of the network, a request for information, the request including information identifying a location of the first device, device information and transmission information combination; determine, based on the received information a geographic location of the first device; and determine if the request for information is a valid request, where a valid request includes a geographic location, device information and transmission information identified in list of valid combinations.

In one example, the device information identifies a mobile device.

In another example, the device information identifies hardware associated with the first device.

In another example, the transmission information identifies a mobile phone carrier.

In another example, the transmission information identifies a network type.

In another example, the network type is a GSM network.

In another example, the device information identifies software associated with the first device.

In another example, the software is an operating system associated with the first device.

In another example, the software is a browser associated with the first device.

In another example, the information indicating the location of the first device is an IP address associated with the first device.

In another example, the information indicating the location of the first device is an IP address associated with a proxy-server.

Another aspect of the invention provides a method of determining the validity of a request for information over a network. The method includes generating a list of valid combinations identifying valid combinations of geographic location, device information and device transmission information; receiving, from a first device of the network, a request for information, the request including information identifying a location of the first device, a time attribute, device information, and device transmission information combination; determining, based on the received information a geographic location of the first device; and selecting, from a plurality of statistical records of requests each associated with at least one geographic location, a statistical record of requests based on the geographic location of the first device, wherein the plurality of statistical records of requests includes information identifying a temporal pattern of requests; determining if the request for information is a valid request, where a valid request includes a geographic location, device information and device transmission information identified in the list of valid combinations, and a time attribute that is consistent with the identified temporal pattern of request for the selected statistical record of requests.

In one example, the device information identifies a mobile device.

In another example, the device information identifies hardware associated with the first device.

In another example, the device transmission information identifies a mobile phone carrier.

In another example, the device transmission information identifies a network type.

In another example, the device information identifies software associated with the first device.

In another example, the software is an operating system associated with the first device.

In another example, the software is a browser associated with the first device.

In another example, the information indicating the location of the first device is an IP address associated with the first device.

In another example, the information indicating the location of the first device is an IP address associated with a proxy-server.

In another example, the information indicating the location of the first device is GPS information identifying a latitude and longitude associated with the first device.

Another aspect of the invention provides a device for determining the validity of a request for information over a network. The device includes memory including a first part storing a list of valid combinations identifying valid combinations of geographic location, device information and device transmission information, and a second part storing a plurality of statistical records of requests each associated with at least one geographic location and each including information identifying a temporal pattern of requests; and a processor. The processor is programmed to receive, from a first device of the network, a request for information, the request including information identifying a location of the first device, a time attribute, device information, and device transmission information combination; determine, based on the received information a geographic location of the first device; and select, from the plurality of statistical records of requests a statistical record of requests based on the geographic location of the first device; determine if the request for information is a valid request, where a valid request includes a geographic location, device information and device transmission information identified in the list of valid combinations, and a time attribute that is consistent with the identified temporal pattern of request for the selected statistical record of requests.

In one example, the device information identifies a mobile device.

In another example, the device information identifies hardware associated with the first device.

In another example, the device transmission information identifies a mobile phone carrier.

In another example, the device transmission information identifies a network type.

In another example, the device information identifies software associated with the first device.

In another example, the software is an operating system associated with the first device.

In another example, the software is a browser associated with the first device.

In another example, the information indicating the location of the first device is an IP address associated with the first device.

In another example, the information indicating the location of the first device is an IP address associated with a proxy-server.

In another example, the information indicating the location of the first device is GPS information identifying a latitude and longitude associated with the first device.

As discussed herein, different features may be used in any combination in any embodiment.

DETAILED DESCRIPTION

Aspects, features and advantages of the invention will be appreciated when considered with reference to the following description of exemplary embodiments and accompanying figures. The same reference numbers in different drawings may identify the same or similar elements. Furthermore, the following description is not limiting; the scope of the invention is defined by the appended claims and equivalents.

The systems and methods in accordance with aspects of the invention verify requests for information over a network. Computing devices communicating over a network transmit numerous signals with various types of information including spatial information, temporal information, device-specific information, and transmission specific information. Signal information may be used to generate statistical records of valid request for information. Various combinations of these signals may be used to determine whether a request for information is a valid request in some examples based on the statistical records generated from signals of prior requests. Where a request for information has been verified, the system and method may provide the information. Where the request for information has not been verified, the system and method may deny the request for information. Thus the system and method may be used to prevent and block scraping and spamming attacks.

Figure 1:
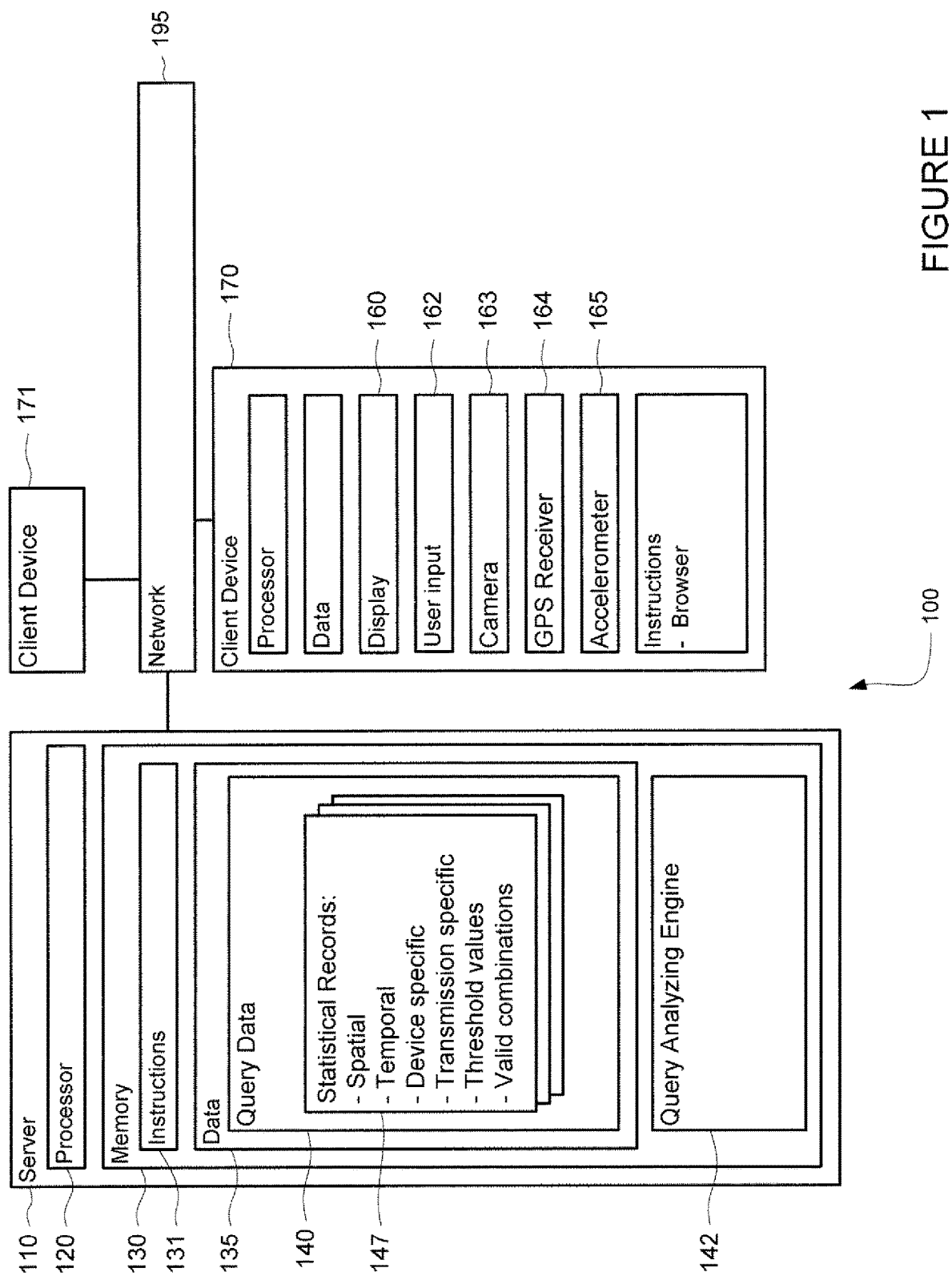
FIG. 1 is a functional diagram of a system in accordance with an aspect of the system and method.
Figure 2:
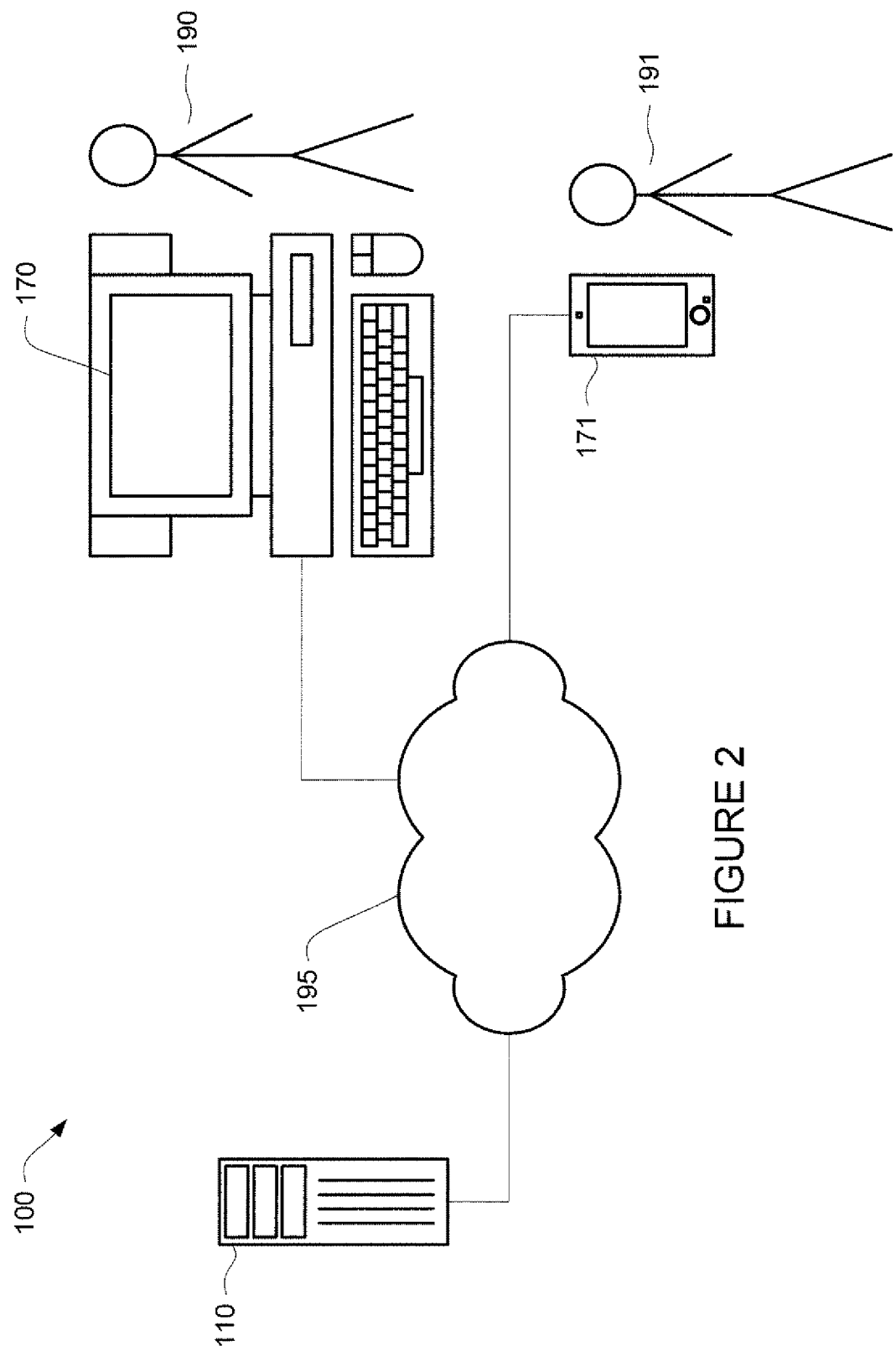
FIG. 2 is a pictorial diagram of a system in accordance with an aspect of the system and method.

As shown in FIGS. 1-2, a system 100 in accordance with one aspect of the invention includes a computer 110 containing a processor 120, memory 130 and other components typically present in general purpose computers.

Memory 130 stores information accessible by processor 120, including instructions 131 that may be executed by the processor 120, as well as data 135. The memory may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. The system and method may include different combinations of the foregoing, whereby different portions of the instructions and data are stored on different types of media.

The instructions 131 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 135 may be retrieved, stored or modified by processor 120 in accordance with the instructions 131. For instance, although the system and method is not limited by any particular data structure, the data may be stored in computer registers, in a relational database as a table having a plurality of different fields and records, XML documents or flat files. The data may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any well-known processor, such as processors from Intel Corporation or Advanced Micro Devices. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. Accordingly, references to a processor or computer will be understood to include references to a collection of processors or computers or memories that may or may not operate in parallel.

The computer 110 may be at one node of a network 195 and capable of directly and indirectly communicating with other nodes of the network. For example, computer 110 may comprise a web server that is capable of communicating with client devices 170-71 via network 195 such that server 110 uses network 195 to transmit and display information to user 190 on display 160 of client device 170. Server 110 may also comprise a plurality of computers that exchange information with different nodes of a network for the purpose of receiving, processing and transmitting data to the client devices; in this instance, the client devices will typically still be at different nodes of the network than any of the computers comprising server 110.

Network 195, and intervening nodes between server 110 and client devices, may comprise various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing. Although only a few computers are depicted in FIGS. 1-2, it should be appreciated that a typical system can include a large number of connected computers.

Each client device may be configured similarly to the server 110, with a processor, memory and instructions. Each client device 170-71 may be a personal computer intended for use by a person 190-191, and have all of the components normally used in connection with a personal computer such as a central processing unit (CPU), memory (e.g., RAM and internal hard drives) storing data and instructions, an electronic display 160 (e.g., a monitor having a screen, a small LCD touch-screen, a projector, a television, a computer printer or any other electrical device that is operable to display information), user input 162 (e.g., a mouse, keyboard, touch-screen or microphone), camera 163, speakers, a network interface device, and all of the components used for connecting these elements to one another.

Although the client devices 170-71 may comprise a full-sized personal computer, the system and method may also be used in connection with mobile devices capable of wirelessly exchanging data with a server over a network such as the Internet. By way of example only, client device 171 may be a wireless-enabled PDA or a cellular phone capable of obtaining information via the Internet. The user may input information using a small keyboard (in the case of a Blackberry phone), a keypad (in the case of a typical cell phone) or a touch screen (in the case of a PDA). Indeed, computers in accordance with the systems and methods described herein may comprise any device capable of processing instructions and transmitting data to and from humans and other computers including general purpose computers, and network computers lacking local storage capability.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system. Yet further, although some functions are indicated as taking place on a server and others on a client, various aspects of the system and method may be implemented by a single computer having a single processor.

The client devices may also include a geographic position component, such as circuits, to determine the geographic location and orientation of the device. For example, client device 171 may include a GPS receiver 164 to determine the device's latitude, longitude and altitude position. The component may also comprise software for determining the position of the device based on other signals received at the client device 171, such as signals received at a cell phone's antenna from one or more cellular tower locations if the client device is a cell phone. It may also include an accelerometer 165 or gyroscope to determine the direction in which the device is oriented. By way of example only, the device may determine its pitch, yaw or roll (or changes thereto) relative to the direction of gravity or a plane perpendicular thereto. In that regard, it will be understood that a client device's provision of location and orientation data as set forth herein may be provided automatically to the user, to the server, or both.

The system and method may process locations expressed in different ways, such as latitude/longitude positions, street addresses, street intersections, an x-y coordinate with respect to the edges of a map (such as a pixel position when a user clicks on a map), names of buildings and landmarks, and other information in other reference systems that is capable of identifying a geographic locations (e.g., lot and block numbers on survey maps). Moreover, a location may define a range of the foregoing. The system and method may further translate locations from one reference system to another. For example, the server 110 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939°)). In that regard, it will be understood that exchanging or processing locations expressed in one reference system, such as street addresses, may also be received or processed in other references systems as well.

As shown in FIG. 1, server 110 may include a query analyzing engine 142 which generates statistical records for valid requests for information. As will be described below, server 110 may receive requests for information or queries from a plurality of client devices and generate various statistical records from the queries.

Server 110 may have access to query data 140. This data may include statistical records 147 based on queries received by the server in the past. As will be described in more detail below, statistical records may be used to determine relevant threshold values and may be used to determine whether a request for information is a valid request. In addition to thresholds, statistical records may identify valid combinations of include two or more values of spatial, temporal, device specific, or transmission specific information received and previously identified as a legal query. For example, a valid combination may include two spatial values; a spatial and a temporal value; a spatial, device specific, and transmission specific value; or any combination of values.

The statistical records may be indexed in a variety of ways. For example, the records may include spatial information, temporal information, device specific information, transmission specific information, threshold values, or other relevant query information.

Spatial information may be associated with a given location. For example, spatial information may include the actual location of the device, such as GPS latitude and longitude coordinates; the location of an IP address or proxy server associated with the device; or the location about which the device is inquiring such as a CellID or Wifi service set identifier (SSID).

Temporal information may be associated with time. For example, temporal information may include the time of a specific request, the frequency of requests from a particular geographic location, a time distribution of similar or unique requests, etc. . . . . Unique requests refers to requests which request different information. For example, if a series of requests includes cell tower ID 1, cell tower ID 2, and cell tower ID 1, the number of unique requests would be 2 as cell tower ID 1 was requested twice.

Device specific information may include both hardware and software data. For example, if the client device were a cell phone, hardware may refer to the type of phone. In that regard, software may refer to the operating system of the client device or the type of browser.

Transmission specific information may include service provider, type of network, or proxy-serer information. For example, if the client device were a cell phone, the service provider may indicate the carrier type. Network type may indicate the type of network which the client device uses to transmit information, for example, GSM, CDMA or TDMA network. Proxy-server may identify an intermediate network location through which a request for information is routed to a server.

Statistical records may be maintained for specific queries as well as for aggregated information. For example, a statistical record associated with a particular client device may include requests received per second, unique requests per second, and the overall time distribution of requests from the particular device. This information may also be aggregated over a large number of client devices to generate aggregate statistical records.

Various operations in accordance with a variety of aspects of the invention will now be described. It should be understood that the following operations do not have to be performed in the precise order described below. Rather, various steps can be handled in reverse order or simultaneously. A specific ordering is not required unless expressly stated herein.

Server 110 may include various requests for information from client devices. Requests for information may include search queries. For example, a query may include a request information relating to a particular key word, a request for image data such as maps or pictures, a request for geographic information, a request for the identification of the location of a signal, for example CellID location or WiFi location, or any other information.

Figure 3:
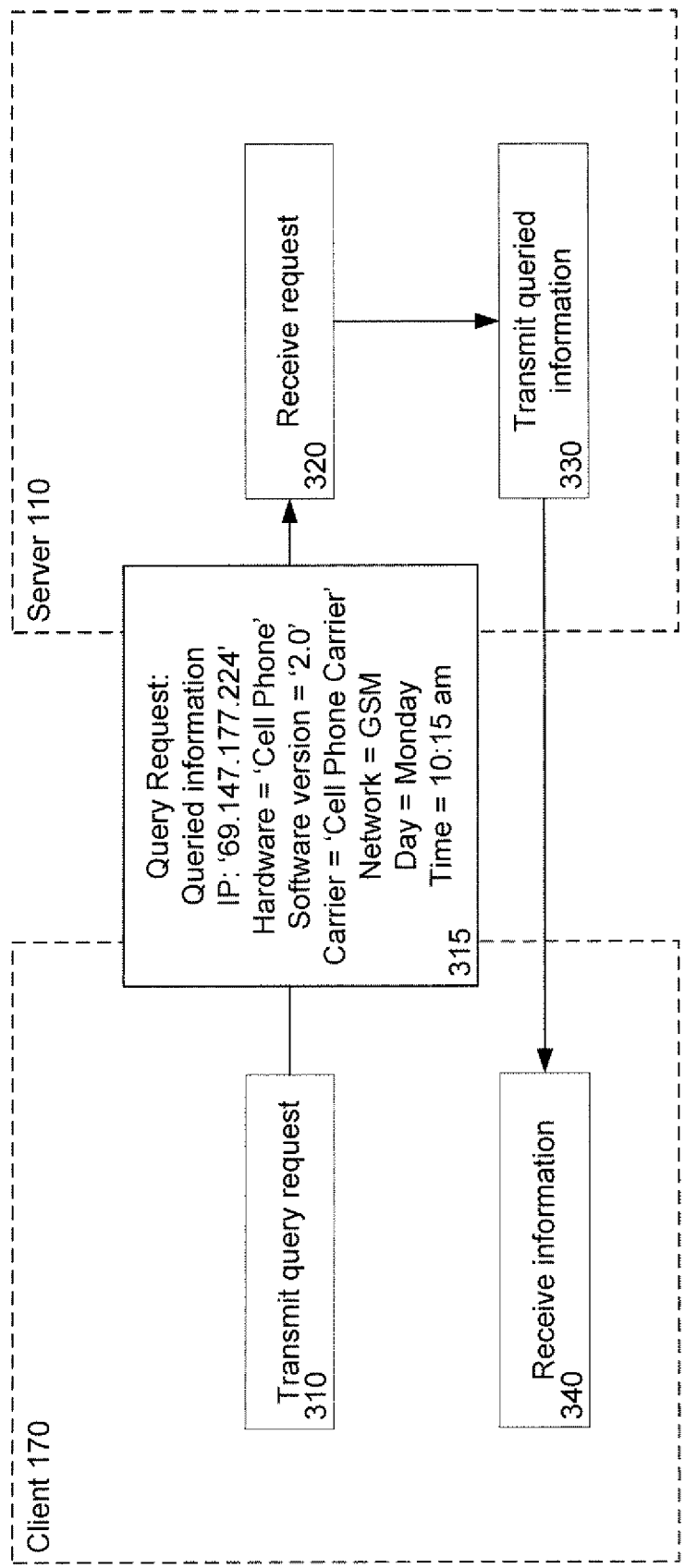
FIG. 3 is a flow chart in accordance with an aspect of the system and method.

Server 110 may determine attributes associated with the request. Attributes may include any information associated with the device. As shown in FIG. 3, server 110 may receive at block 320 a request for information transmitted at block 310 by a client device 170. In response, at block 330 server 110 may transmit the requested information, and it may be received at block 340 by client 170. As shown in block 315, in addition to the subject of the request, the server may also receive various signals, and use the information to identify various types of information associated with the client device. For example, the request may identify an IP address, a device type, software version, carrier, network type, date and time, etc.

Server 110 may use this information to determine information associated with the device. For example, the server may determine an approximate location of the device. Server 110 may determine that the IP address 69.17.177.224 is located within the Aurora, Ontario, Canada area. In another example, some attributes may be approximated, for instance, 10:15 am on Monday may be approximated to daytime on Monday.

Figure 4:
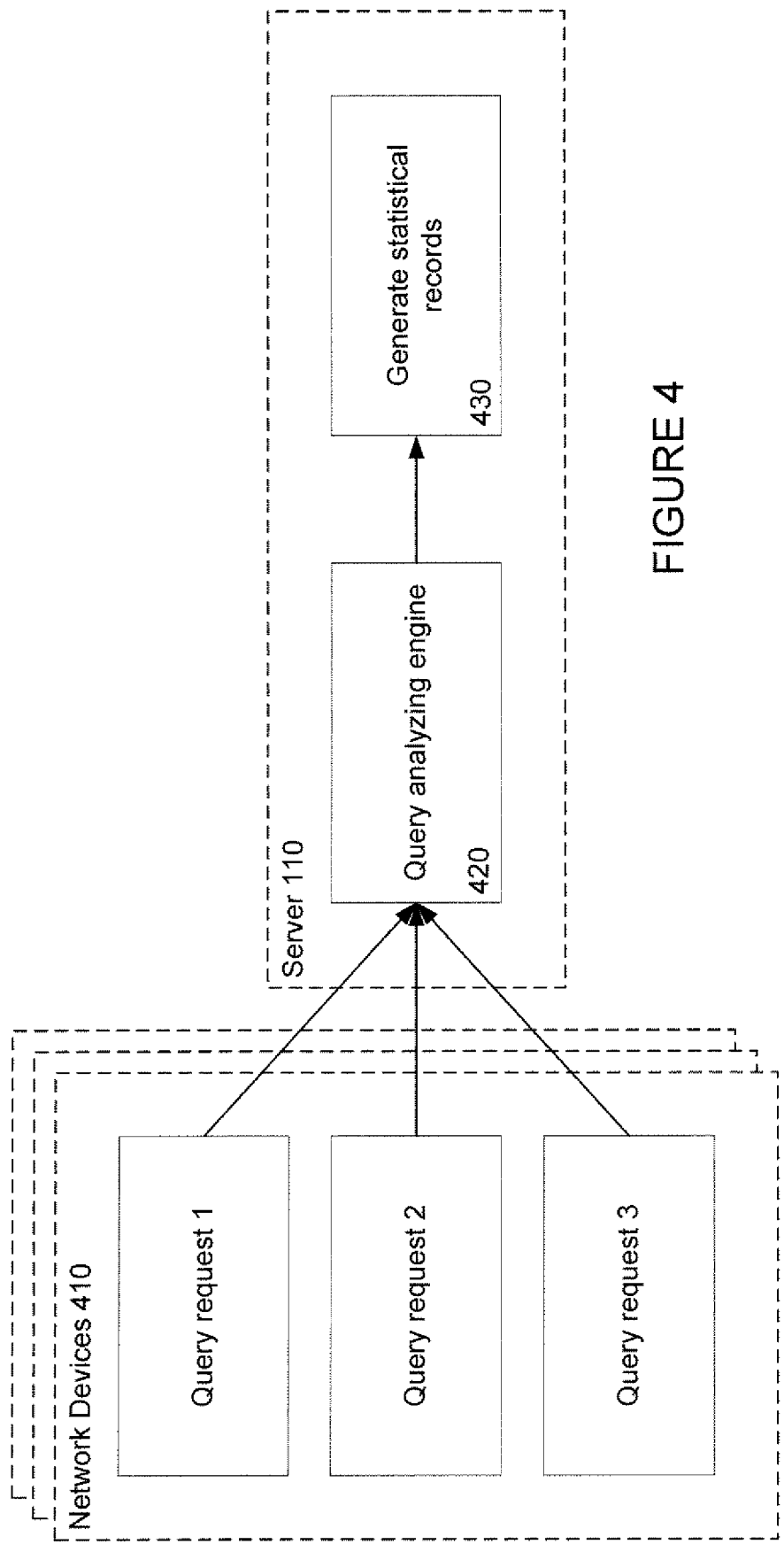
FIG. 4 is a flow chart in accordance with an aspect of the system and method.

Server 110 may use information determined from various requests to generate statistical records. As shown in FIG. 4, server 110 receives various requests, for example query requests 1-3, from a plurality of devices 410 of network 195. The server uses a query analyzing engine 420 to analyze the information associated with the requests and generates statistical records at block 430. As described above, the statistical records may also include information aggregated from a large number of requests for information. These records may be used by the server to determine whether other requests for information are valid requests.

When a request for information is received, the server may use signals associated with the client device to identify attributes and select one or more relevant statistical records. The server may select a statistical record which is associated with, for example, the same or similar geographic information, hardware, software, carrier, or network type as those associated with the query request.

Server 110 may use the identified attributes to determine whether the request for information is a valid request. When determining validity, the server may use a variety of combinations of signals. One of the advantages of the invention is its ability to accommodate a wide variety of alternatives and additions to the features described below. For example, the system and method may include combinations such as two spatial signals; spatial and temporal signals; device and transmission signals; spatial, device and transmission signals; spatial, device, transmission, and temporal signals; or various other combinations of signals.

Figure 5:
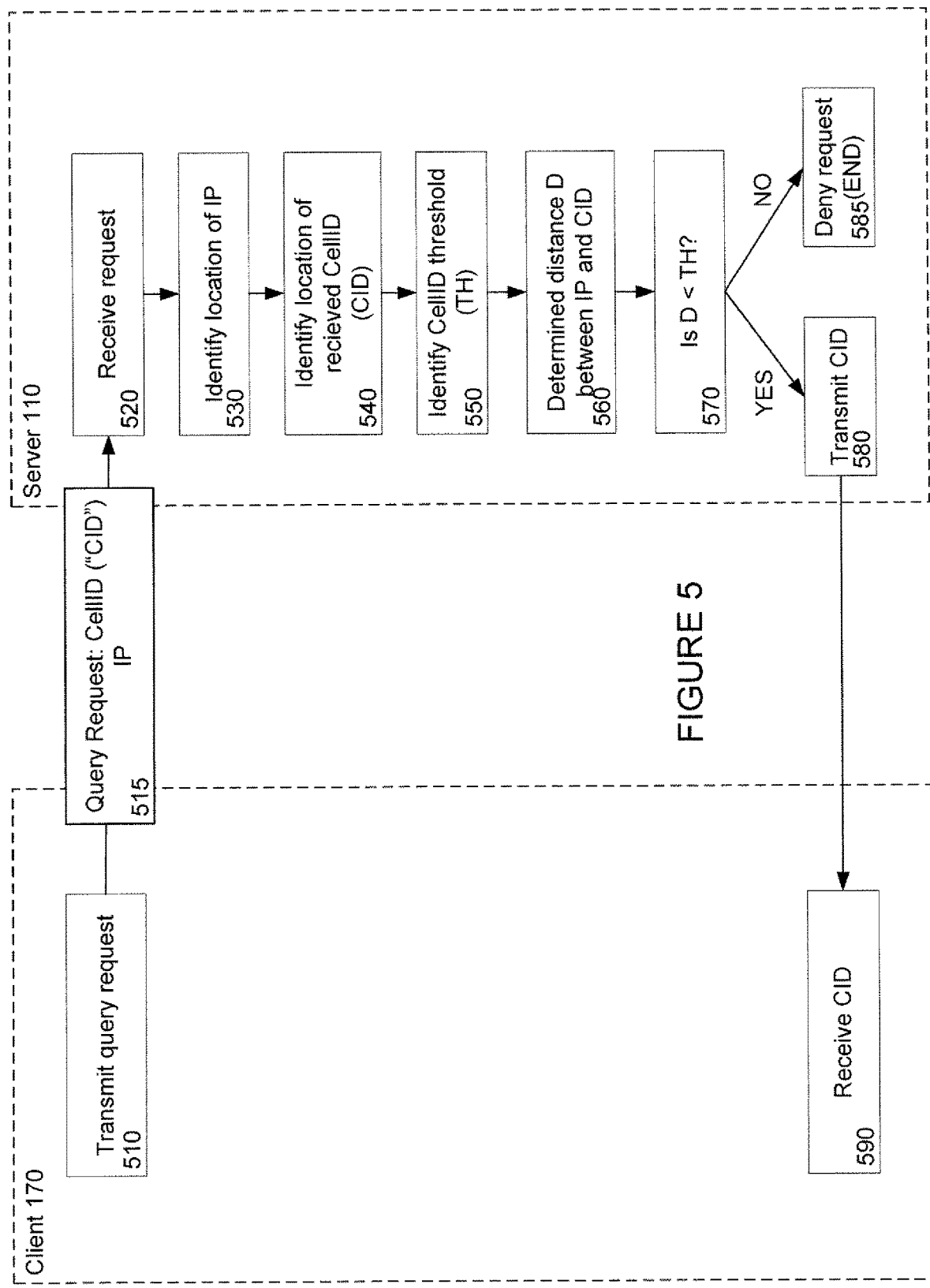
FIG. 5 is a flow chart in accordance with an aspect of the system and method.

Aspects of the invention may utilize two spatial signals in order to determine whether a request is valid. For example, as shown in FIG. 5, client device 170 may transmit a query request 515 for the location associated with a particular CellID associated, for example, with a cellular tower to server 110. At block 520, the server may receive the request. From signals received with the request, the server may determine the approximate location of the requesting client device. The spatial signal may include GPS, IP address, or the identification of broadcast structure locations such as cellular tower locations. Thus, the location of the requesting device may be determined from known methods such as GPS locating, identifying a location from an IP address lookup table, or cellular tower location triangulation. As shown in the example of block 530, the server may identify a location of client 170 based on the IP received in request 515. Based on the received CellID, server 110 may identify the location of the cellular tower as shown in block 540. Server 110 may also identify a CellID threshold value at block 550. For example, the server may identify a relevant threshold value associated with the CellID from a statistical record of requests with a relevant location or the threshold may be set to a value for each location or CellID or for all locations or CellIDs.

The server may perform a distance comparison between the location of the requesting client device and the location of the CellID as shown in blocks 560 and 570. If the distance (D) is less than the threshold value (TH) as set forth in block 570, then as shown in block 580 server 110 may transmit the location of the Cell ID. If the distance (D) is greater than the threshold value (TH), the server may determine that the request for information is invalid, and is, for example, a scraping or spamming attack. As shown in block 585, in this case the server may then deny or ignore the request for information, and the server may use the information about the invalid request to generate additional statistical records.

For example, server may receive a request from a client device for a CellID. The server may determine the CellID threshold is 1 mile. The server may determine that the IP address of the requesting client device is associated with Sunnyvale, Calif. The server may determine that the requested CellID is associated with San Franscisco, Calif. The server may determine that the approximate distance between these locations is greater than 1 mile and accordingly deny the request as invalid.

Figure 6:
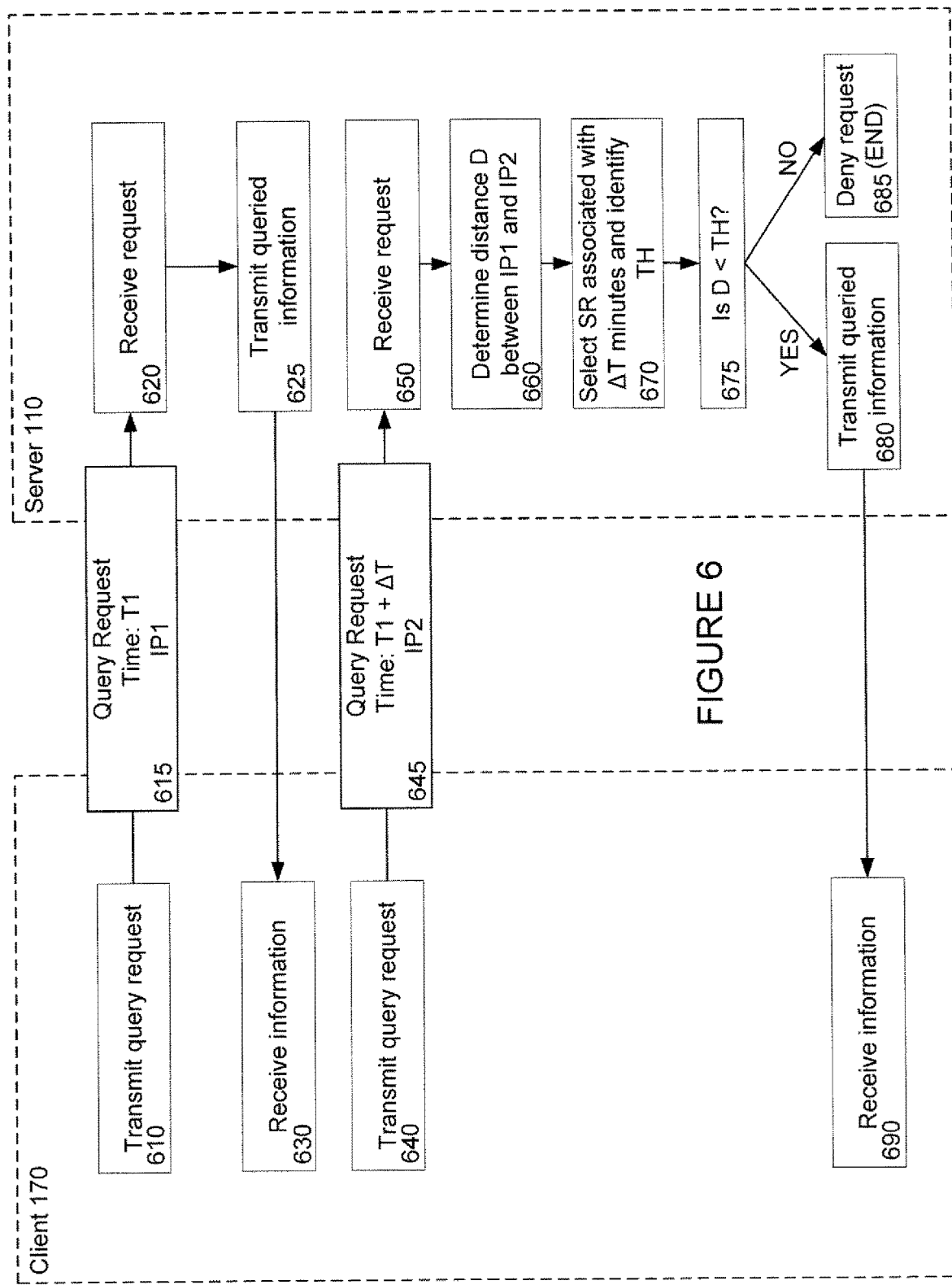
FIG. 6 is a flow chart in accordance with an aspect of the system and method.

The system and method may utilize a combination of spatial and temporal signals in order to determine whether a request is valid. For example, as shown in FIG. 6, the server may receive two requests, 615 and 645, from a particular client device within a period of time. As shown in blocks 610 and 640, client 170 may transmit a first request for information at time T1 and a second request for information at some later time T1+ΔT. At blocks 620 and 650, the server may receive the request. As shown in block 625, the server may transmit the requested information which is then received at block 630 by client 170.

After receiving the second request, the server may determine the locations associated with each request and the distance between the two locations as shown in block 660. The server may also retrieve a statistical record associated with the period of time (ΔT) between the first and second requests as shown in block 670. The statistical record may include information related to multiple requests from client devices where each request from a particular device is from a different location. The statistical record may identify the greatest average distance between locations of two requests from client devices within a period of time. This greatest average distance may identify a threshold value. As shown in block 675, server 110 may compare the distance between the location associated with the request. If the distance is less than the threshold value, the server may transmit the requested information at block 680 which is then received by the client 170 at block 690. If the distance between locations of each request is greater than the threshold distance associated with the statistical record, as shown in block 685, the server may deny the request for information as invalid.

Thus, if the server receives a request from a client device associated with an IP address of Sunnyvale Calif. at 10:15 am and a second request from the same client device 10 minutes later associated with Phoenix Ariz., the server may select a statistical record associated with the time difference of 10 minutes. The statistical record may identify a maximum distance of 30 miles. The server may determine the distance between Phoenix and Sunnyvale as greater than 30 miles. Accordingly, the server may identify one or both of the requests as invalid.

Figure 7:
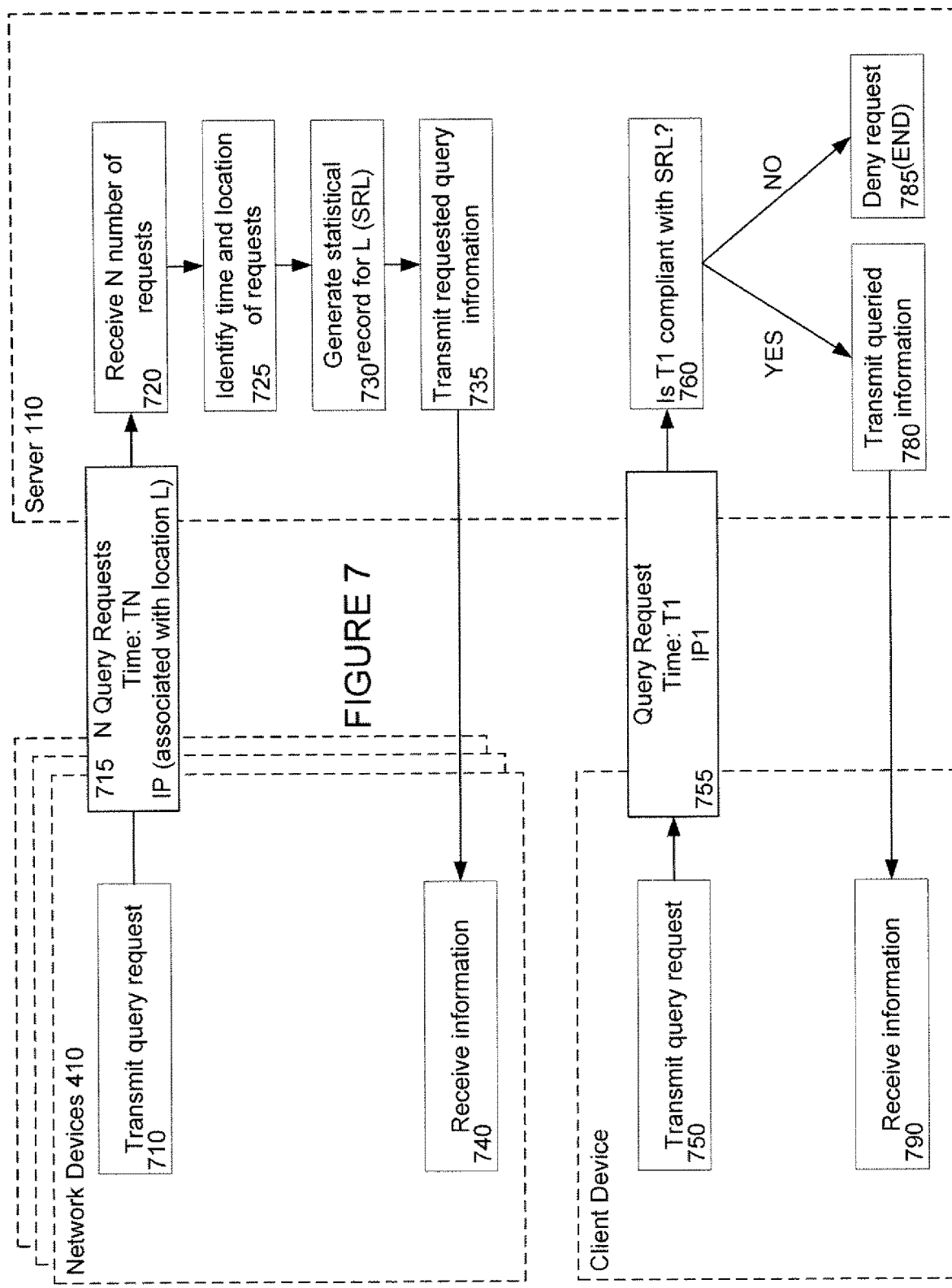
FIG. 7 is a flow chart in accordance with an aspect of the system and method.

In another example, shown in FIG. 7, the server may generate a statistical record associated with a location based on the queries received from that location over a period of time. The resulting statistical record demonstrates a temporal pattern of requests associated with the geographic location. As shown in block 710, a plurality of network devices 410 transmit query requests at block 710 to server 110. As shown in block 715, each of the query requests is associated with a time and location information, in the example, IP address. Thus, when the server receives the requests for information at block 720, the server may determine a time and geographic location associated with each request as shown in block 725. Server 110 may use this information to generate a statistical record for one or more locations, for example, a fixed distance from a point geographic region such as a city, state, or country, at block 730. Server 110 may also transmit the requested information at block 735 which may be received by the requesting device of network devices 410 at block 740.

At block 750, client device 170 may transmit a query request 755. Then, server 110 may compare the time of the request to the temporal pattern of the statistical record associated with the same or a similar geographic location as shown in block 760. If the requests comply with the statistical record, as shown in block 780, server 110 may transmit the requested information which may be received by client device 170 as shown in block 790. If the requests do not comply with the statistical record, the request is identified as invalid and denied as shown in block 785.

Thus, the server may generate a statistical record of the temporal pattern of requests for San Francisco. The temporal pattern may demonstrate that most valid requests for the metropolitan area on weekdays occur during the early evening or daytime. If the server detects a large quantity of queries originating from San Francisco at midnight on Tuesday, the server may identify these requests as invalid.

Aspects of the invention may utilize a combination of device and transmission signals in order to determine whether a request is valid. As shown in block 810 of FIG. 8, the server may identify valid requests by comparing device and transmission signals to known possible and impossible combinations of the same. For example, a particular type of mobile device may be known only to transmit on a particular type of network. In another example, a particular type of mobile device may be known only to work with a particular mobile carrier. Thus, at block 820, the server may generate a statistical record associated with a particular type mobile device. The statistical record may accordingly identify possible or impossible network types. Possible network types may include a single network, or a set of networks. Although the example of FIG. 8 demonstrates possible network types, it will be understood that a similar method may also be used with impossible network types or for possible or impossible mobile carriers.

Figure 8:
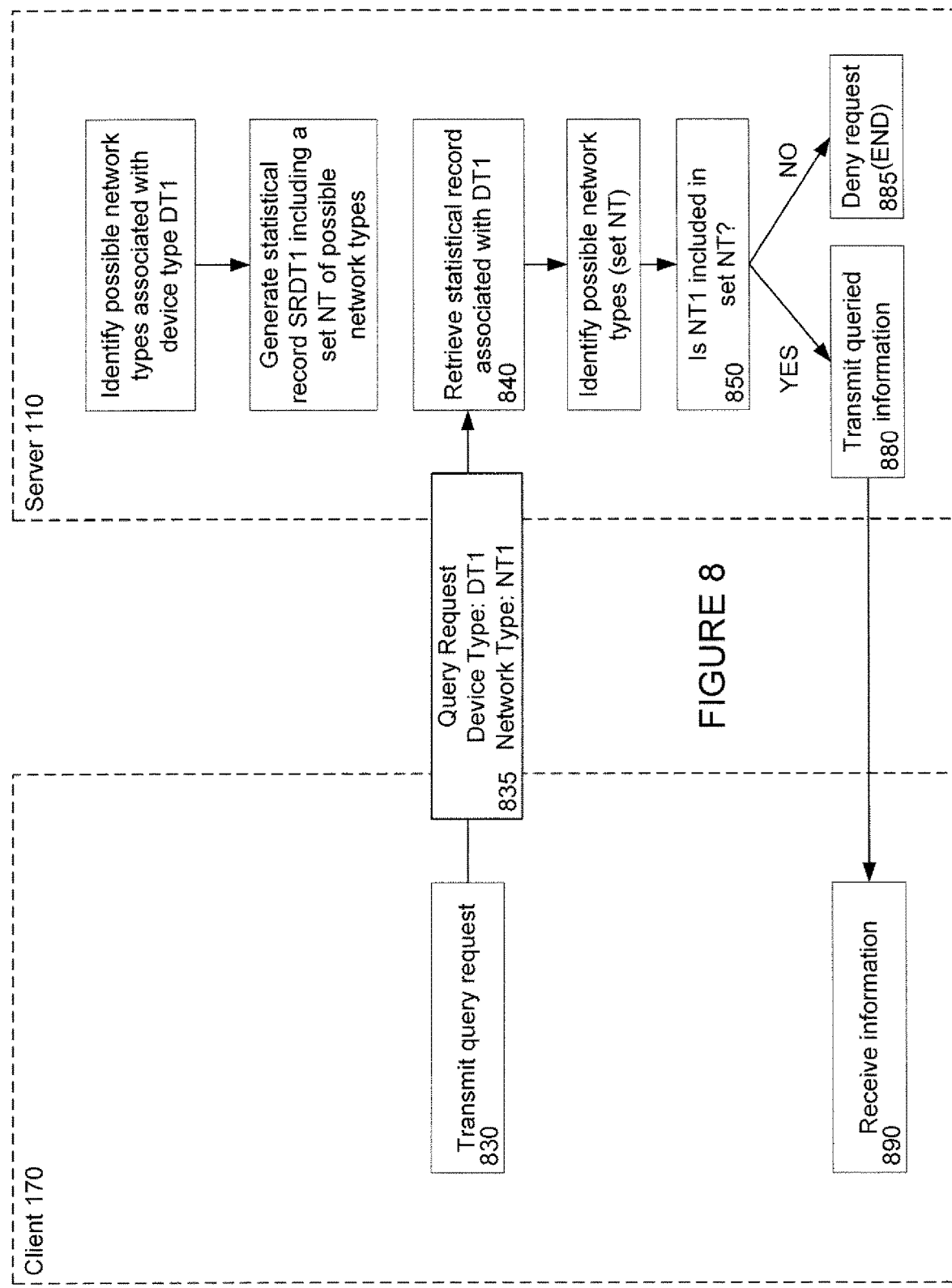
FIG. 8 is a flow chart in accordance with an aspect of the system and method.

In the example of FIG. 8, at block 830, client device 170 transmits a query request 835. When the server receives requests for information from a client device identified as the particular type of client device, server may retrieve the statistical record associated with the identified type of client device as shown in block 840. Server 110 may use the statistical record associated with the identified client device to determine if the network type associated with the requesting client device is possible or impossible as shown in blocks 850 and 860. If the identified network type is included in the set of possible network types, the server may identify the request for information as a valid request. The server may transmit the requested information as shown in block 880 which may then be received by client 170 at block 890. If the identified network type is not included in the set of possible network types, the server may identify the request for information as an invalid request and deny the request as shown in block 885.

In one example, the server may identify that the only possible network on which a "T-phone" may transmit is a GSM network. Thus server may generate the statistical record [T-phone; NT], where NT=[GSM]. Server may receive a request for information including a signal identifying the requesting device as a T-phone. Server may retrieve the statistical record [T-phone; NT]. Server may identify a network type from the transmission signal of the client device. If, for example, the identified network type is GSM, the device type/network combination of the of the request for information will be identified as valid, and the request granted. If, for example, the identified network type is TDMA, the device type/network combination of the request for information will be identified as invalid, and the request denied.

The system and method may utilize a combination of spatial, device, and transmission signals in order to determine whether a request is valid. Thus in addition to the combination described above, the server may also consider spatial signals associated with a request for information. In one example, a particular mobile device type D1, is associated with a particular mobile carrier's network, T1, and the device is not used in a country S1. Thus, if the server identifies a request from device type D1 in country S1 on a network T2, the server may identify the device D1 and as likely to be an attacker and block any requests from the device. In another example, if it is known that a particular mobile device type D2 cannot be used with a particular transmission network N1 (e.g. TDMA or CDMA) in a country S2, then the server may identify requests associated with such a combination as invalid attacks. In either example, the server may then take any of the actions described above.

The system and method may utilize a combination of spatial, device, transmission, and temporal signals in order to determine whether a request is valid. Thus in addition to the combination of spatial, device, and transmission signals described above, the server may also consider temporal signals associated with a request for information. In one example, users of a mobile device D1 of network N1 in a particular location S1 are associated with a particular level of queries-per-second (QPS) on weekdays, which may be different from the QPS on weekends of a mobile device D2 of network N2 in a particular location S1. Accordingly, the server may identify attacks by determining if the received combinations of signals comply with statistics such as those described above.

Figure 9:
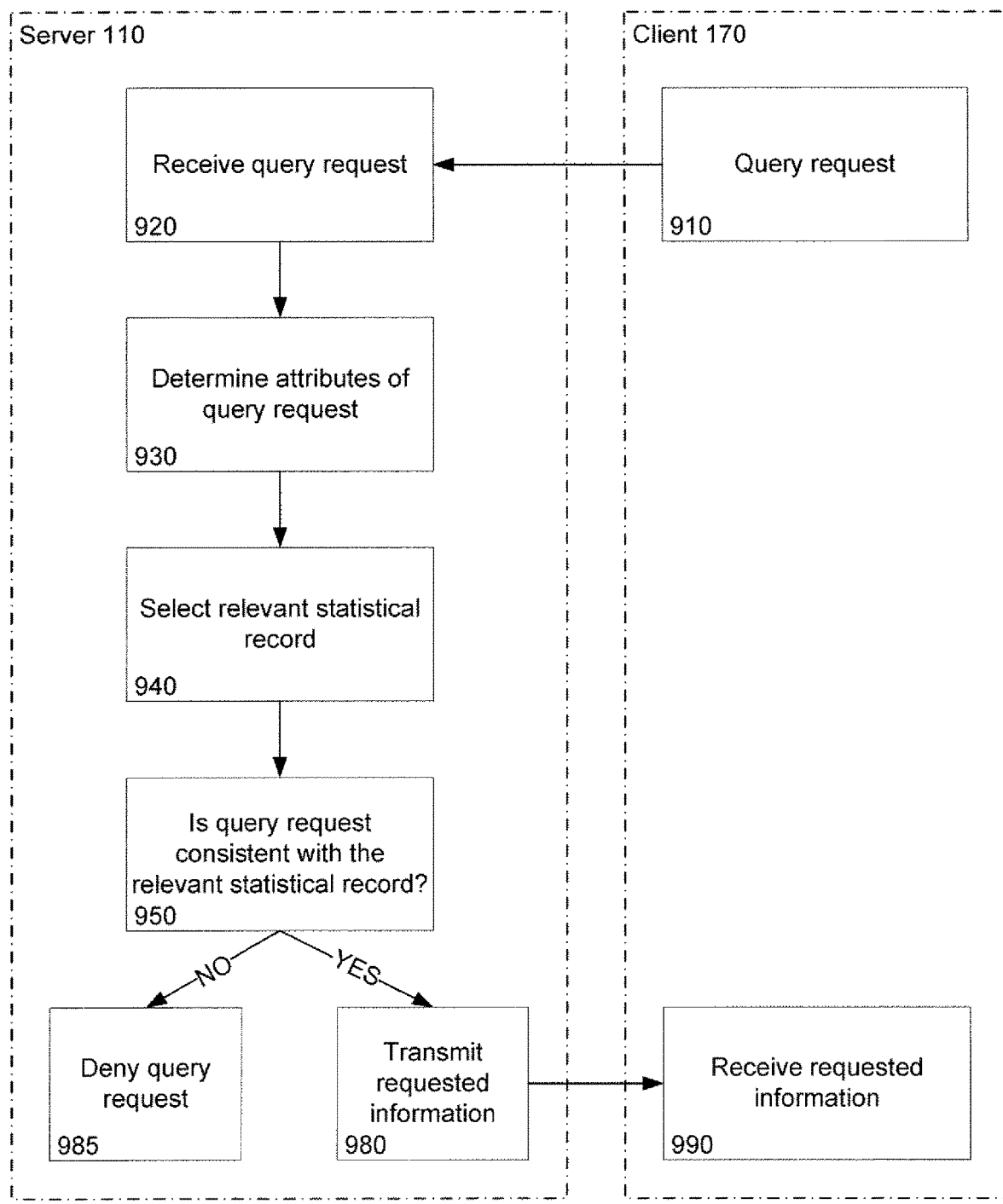
FIG. 9 is a flow chart in accordance with an aspect of the system and method.

FIG. 9 is an exemplary flow diagram in accordance with aspects of the invention. As shown in block 910, client 170 may transmit a query request to server 110. The server may receive the request at block 920 and determine the attributes of the query request at block 930. Using this information, the server may select a relevant statistical record at block 940. As shown in block 950, server 110 may compare the attributes of the query request to the relevant statistical record to determine if they are consistent. If the query request is consistent with the relevant statistical record, the server may identify the request as a valid request and transmit the requested information at block 980. This information may be received by client device 170 at block 990. If the query request is not consistent with the relevant statistical record, the server may identify the request as an invalid request and deny the request as shown in block 985.

In other aspects, functions described above as being performed by the server may be performed by the client device, and vice versa. For example, the client device may identify the attributes to the server. In yet more aspects, the client device and server perform and share different functions.

It will be further understood that the sample values, types and configurations of data described and shown in the figures are for the purposes of illustration only. In that regard, systems and methods in accordance with aspects of the invention may include different physical attributes, data values, data types and configurations, and may be provided and received at different times and by different entities (e.g., some values may be pre-suggested or provided from different sources).

As these and other variations and combinations of the features discussed above can be utilized without departing from the invention as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

Unless expressly stated to the contrary, every feature in a given embodiment, alternative or example may be used in any other embodiment, alternative or example herein. For instance, any technology for determining the geographic location and orientation associated with a camera or particular image may be employed in any configuration herein.

Each way of communicating or identifying the location of a traffic signal or the status of the traffic signal may be used in any configuration herein.

The invention claimed is:

1. A method of determining the validity of a request for information over a network, the method comprising:
    storing a plurality of threshold values each associated with a geographic location, the threshold values corresponding to a distance from their respective geographic locations;
    receiving, by one or more processors, from a first device of the network, a request for information regarding a target identified by the first device in the request for information, the target having an associated target geographic location, and the request including information indicating a device geographic location of the first device;
    selecting, by the one or more processors, a threshold value from the plurality of stored threshold values based on the target geographic location; and
    determining, by a second device of the network, if the request for information is a valid request, where the valid request identifies the target geographic location as being less than a threshold distance from the device geographic location of the first device.

2. The method of claim 1, wherein the target geographic location is identified by a WiFi signal.

3. The method of claim 1, wherein the target geographic location is identified by a broadcast structure location.

4. The method of claim 1, wherein the information indicating a device geographic location of the first device includes an IP address.

5. The method of claim 1, wherein the information indicating a device geographic location of the first device includes GPS coordinates.

6. The method of claim 1, further comprising transmitting, by the one or more processors, the requested information if the request is an invalid request.

7. The method of claim 1, further comprising transmitting, by the one or more processors, to the first device, the requested formation if the request is a valid request.

8. The method of claim 3, wherein the broadcast structure location is a cellular tower location.

9. A system for determining the validity of a request for information over a network, the method comprising:
    one or more memories storing a plurality of threshold values each associated with a geographic location, the threshold values corresponding to a distance from their respective geographic locations;
    one or more processors in communication with the one or more memories and configured to:
        receive from a first device of the network, a request for information regarding a target identified by the first device in the request for information, the target having an associated target geographic location, and the request including information indicating a device geographic location of the first device;
        select a threshold value from the plurality of stored threshold values based on the target geographic location; and
        determine if the request for information is a valid request, where the valid request identifies the target geographic location as being less than a threshold distance from the device geographic location of the first device.

10. The system of claim 9, wherein the target geographic location is identified by a WiFi signal.

11. The system of claim 9, wherein the target geographic location is identified by a broadcast structure location.

12. The system of claim 9, wherein the information indicating a device geographic location of the first device includes an IP address.

13. The system of claim 9, wherein the information indicating a device geographic location of the first device includes GPS coordinates.

14. The system of claim 9, further comprising transmitting, by the one or more processors, the requested information if the request is an invalid request.

15. The system of claim 9, further comprising transmitting, by the one or more processors, to the first device, the requested formation if the request is a valid request.

16. The system of claim 11, wherein the broadcast structure location is a cellular tower location.

17. A non-transitory computer readable medium storing instructions executable by one or more processors to perform a method of determining the validity of a request for information over a network, the method comprising:
    storing a plurality of threshold values each associated with a geographic location, the threshold values corresponding to a distance from their respective geographic locations;
    receiving from a first device of the network, a request for information identifying a target identified by the first device in the request for information, the target having an associated target geographic location, and the request including information indicating a device geographic location of the first device;
    selecting a threshold value from the plurality of stored threshold values based on the target geographic location; and
    determining if the request for information is a valid request, where the valid request identifies the target geographic location as being less than a threshold distance from the device geographic location of the first device.

* * * * *